United States Patent Office 3,412,120
Patented Nov. 19, 1968

---

3,412,120
CYANOALKYLENETIN SULFIDES AND THE PREPARATION THEREOF
William J. Considine, Somerset, and Gerald H. Reifenberg, Plainfield, N.J., assignors to M&T Chemicals Inc., New York, N.Y., a corporation of Delaware
No Drawing. Filed Jan. 3, 1966, Ser. No. 517,924
14 Claims. (Cl. 260—429.7)

This invention relates to organotin sulfides of the type characterized by the presence of a nitrile group of the formula:

$$[NC(CH_2)_m]-$$

wherein $m$ is an integer at least about 2. The invention is also concerned with methods for preparing the novel organotin sulfides.

Broadly stated, the organotin sulfide of the aforenamed type has the general formula:

$$\{[NC(CH_2)_m]_nSn\}_yS_z$$

in which $m$ has the same meaning as above depicted, $n$ is an integer 1–3, $y$ is 1 or 2, $z$ is 1 or 3, and the combinations of $n$, $y$ and $z$ satisfy a tetravalent structure. Preferably, the polymethylene chain in the nitrile group contains less than 5 carbon atoms.

According to this invention, the organotin sulfide may be prepared advantageously by the method which comprises reacting a sulfide selected from the group consisting of alkali metal sulfides and alkali hydrogen sulfides with an organotin halide of the general formula:

$$[NC(CH_2)_m]_nSnX_{4-n}$$

in which X is chlorine, bromine, or iodine and $m$ and $n$ have the same meanings as stated above. The organotin sulfide thus formed is recovered from the reaction mixture. When alkali metal sulfide is used in the reaction the above described method may be represented by the following sets of equations. Each of the equations represents the reaction of alkali metal sulfide with one type of halide.

(1) $2[NC(CH_2)_m]SnX_3 + 3M_2S \rightarrow$
$\qquad [NC(CH_2)_mSn]_2S_3 + 6MX$ (2) $[NC(CH_2)_m]_2SnX_2 + M_2S \rightarrow$
$\qquad [NC(CH_2)_m]_2SnS + 2MX$ (3) $2[NC(CH_2)_m]_3SnX + M_2S \rightarrow$
$\qquad \{[NC(CH_2)_m]_3Sn\}_2S + 2MX$ M=alkali metal Preferably, the organotin sulfide of this invention is prepared by an alternative procedure in which a stoichiometric excess amount of alkali metal sulfide or alkali metal hydrogen sulfide is used to react with the organotin halide followed by acidification to form the organotin sulfide. The acidification preferably is carried out with acetic acid. In this alternative method, the organotin sulfide which forms immediately when the alkali metal sulfide or alkali metal hydrogen sulfide is added to the organotin halide redissolves in the solution when the excess amount of sulfide is added. In the acidification step, the acetic acid added in the solution converts the sodium salt in the solution into free acid which is unstable and decomposes immediately into the organotin sulfide of this invention.

This alternative method may be illustrated by the two following typical reactions in which bis(2-cyanoethyl)tin dibromide and (2-cyanoethyl)tin tribromide are reacted with excess amounts of sodium sulfide respectively.

(4) $(NCCH_2CH_2)_2SnBr_2 + 2Na_2S \xrightarrow{H_2O}$
$\qquad (NCCH_2CH_2)Sn(SNa)_2 + 2NaBr$ $(NCCH_2CH_2)_2Sn(SNa)_2 + 2HOCCH_3 \xrightarrow{H_2O}$ $\qquad [(NCCH_2CH_2)_2Sn(SH)_2] + 2NaOCCH_3$ $[(NCCH_2CH_2)_2Sn(SH)_2] \longrightarrow (NCCH_2CH_2)_2SnS + H_2S \uparrow$ (5) $NCCH_2CH_2SnBr_3 + 3Na_2S \xrightarrow{H_2O} NCCH_2CH_2SnS_3Na_3 + 3NaBr$ $NCCH_2CH_2Sn(SNa)_3 + 3HOCCH_3 \xrightarrow{H_2O}$ $\qquad [NCCH_2CH_2Sn(SH)_3] + 3NaOCCH_3$ $2[NCCH_2CH_2Sn(SH)_3] \longrightarrow (NCCH_2CH_2Sn)_2S_3 + 3H_2S \uparrow$ In essence, this alternative procedure may be considered as a two-step process in which the first is the organotin sulfide forming step, and the second is the purification step involving the redissolution of the organotin sulfide in the excess alkali metal sulfide and the regeneration by acidification. It is, therefore, understood that the two steps in the process may be used concurrently as described previously, or it may be used separately, in which case the organotin sulfide is recovered prior to purification.

The suitable organotin halides which may be employed to form the novel product of this invention may be prepared by any of the available methods. Preferably, they are prepared by the methods disclosed in our copending patent applications filed concurrently herewith entitled, "Organotin Complex" and "Organotin Halides," in which the organotin halides are prepared respectively, by redistribution and by halogenation. In the former case, the 1:1 complex of $[NC(CH_2)_m]_4Sn$ and $SnX_4$ is redistributed by heating to form a composition containing $$[NC(CH_2)_m]_3SnX$$

and $[NC(CH_2)_m]_2SnX_2$ and $[NC(CH_2)_m]SnX_3$. Each of the three halides are then isolated from the redistribution mixtures. In the latter case, the halides are prepared by reacting an active halogen with an organotin of the formula:

$$[NC(CH_2)_m]_nSnR_{4-n}$$

in which $n$ is an integer 1–3, and R is an alkyl, aryl, alkaryl, aralkyl or an alkenyl. In either case, the resultant halides are of sufficient purity that we found to be eminently suitable for the present invention. The preferred halides have the formula:

$$[NC(CH_2)_m]_nSnX_{4-n}$$

in which $m$ is an integer 2–4, and X is chlorine or bromine.

A number of alkali metal sulfides or alkali metal hydrogen sulfides (alkali metal hydrosulfides) are found to be suitable for the process of this invention. From the point of availability and economics, sodium sulfide or sodium hydrosulfide are preferred. Sulfides or hydrosulfides of potassium and lithium may also be used to advantage.

There does not appear to be any sharp critical limitation as to the molar ratio of reactants used in the reaction. Generally, the stoichiometric amount is preferred. If the process is carried out according to the alternative procedure, the alkali metal sulfide required is about twice the amount used in the first type of reaction where the redissolution and regeneration do not occur. Both types of reactions are preferably carried out in an aqueous reaction medium and at room temperature. Any water-miscible, organic solvent may be added as co-solvent.

To further illustrate this invention specific examples are described herein below.

Example 1.—Preparation of bis(2-cyanoethyl)tin sulfide

The reaction used in this example follow the Equation 4 stated above.

To an aqueous solution of $(NCCH_2CH_2)_2SnBr_2$ was added, with stirring over a one-minute period, an aqueous solution of $Na_2S$. The white precipitate which originally formed dissolved upon further addition of $Na_2S$ giving a clear olive-green solution. Addition of an aqueous acetic acid solution over a 2-minute period caused a white precipitate to form. This was accompanied by the evolution of $H_2S$. When addition of acid was complete, the mixture was filtered with water suction and the white solid collected. This white solid was washed well with distilled water until a small portion of the wash water gave only a yellow coloration but no precipitate of AgBr. After drying in a circulating oven at 50° C., $(NCCH_2CH_2)_2SnS$ (20.0 g., 85.9%) was collected. M.P.=163–164.5° C. (dec.). Recrystallization of bis(2-cyanoethyl)tin sulfide (19.5 g.) from an acetone-methanol solvent pair yielded 12.8 g. of purified bis(2-cyanoethyl) tin sulfide. The melting point of recrystallized product was raised to 173–5° C. (clear, uncorr.). Concentration of the mother liquor from the first crop yielded a second crop of crude sulfide (3.4 g., M.P.=159–162° clear, uncorr.). Recrystallization of this second crop from an acetone-methanol solvent pair yielded 2.9 g. of product and raised the melting point to 173–5° C. (clear, uncorr.). Mixed M.P. of the recrystallized first and second crops showed no depression. A small portion of the major crop (first one), recrystallized again from an acetone-methanol solvent pair showed no change in melting point or mixed melting point. A total of 15.7 g. of purified $(NCCH_2CH_2)_2SnS$ was recovered. This represented an overall yield of 67.4% of pure product.

*Elemental analysis.*—Calc. for $C_6H_8N_2SSn$: Sn, 45.84; N, 10.82; S, 12.37; mol.wt. (for trimer) 776. Found: Sn, 45.45; N, 10.81; S, 12.45; mol. wt. (in THF) 620.

The di(2-cyanoethyl)tin sulfide produced in this example is a white crystalline solid which may exist in the form of a trimer. Its infrared spectrum shows a doublet in the nitrile stretching region at 4.45μ (shoulder at 4.43μ) when run as a nujol mull. However, in tetrahydrofuran solutions the shoulder at 4.43μ disappears. This indicates some type of association of the trimer with itself (nitrile group of one trimer molecule coordinating with the tin atom of another molecule).

Example 2.—Preparation of di(2-cyanoethyl)tin sulfide

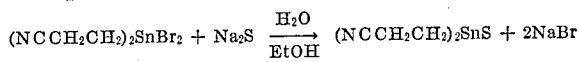

To a 50 mls. solution of ethyl alcohol containing 21.5 gms. of dissolved di(2-cyanoethyl)tin dibromide there was added slowly 50 mls. solution of $Na_2S$ (8.7 gms. $Na_2S \cdot 9H_2O$) causing a white precipitate to form at first and then turning to a brownish solution. During the addition the temperature of the reaction mixture increased from 28° C. to a maximum of 40° C. while the reaction vessel was kept in a water bath. With agitation, the reaction was kept at 27° C. for 1 hour and a yellow solution containing gray solids was obtained. The gray solids were recovered by filtration and were recrystallized using methyl alcohol and a few drops of acetone. When dried, the solids weighed 4.5 grams. The melting point was found to be 173–175° C. and the yield was 31.0%.

Example 3.—Preparation of bis[tris(2-cyanoethyl)tin] sulfide

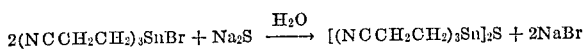

A solution of 5.0 gms. $Na_2S \cdot 9H_2O$ in 15 mls. of water was added rapidly to a solution of 11.5 gms. of tris(2-cyanoethyl)tin bromide in 60 gms. by weight of tetrahydrofuran. The reaction was carried out at room temperature for 75 minutes with agitation. During the reaction the temperature increased to 30° C. After 75 minutes, the layers were separated. The upper organic layer was stripped free of solvent by distillation under reduced pressure, to yield 9.5 gms. of a thick yellow-brown liquid residue (88.8% of theoretical). Further purification by dissolution in tetrahydrofuran and subsequently in acetone, followed by filtration and removal of solvent yielded 5.7 gms. of a clear viscous liquid (yield 60%). The liquid had a refractive index at 28° C. of 1.5745.

*Elemental analysis.*—Calc.: Sn, 39.8%; N, 14.3%; S, 5.40. Found: Sn, 36.9%; N, 12.5%; S, 5.65%.

Example 4.—Preparation of $(NCCH_2CH_2Sn)_2S_3$

The reactions carried out in this example may follow Equation 5 stated above.

32.6 gms. of $Na_2S$ in aqueous solution was charged to 34.5 gms. of $NCCH_2CH_2SnBr_3$ in 100 mls. of water. The white precipitate initially formed redissolved in the solution yielding an olive-green solution. Acidification of this solution with 32.0 gms. of dilute acetic acid caused precipitation of an off-white solid together with much gassing ($H_2S$). The solid was recovered by filtration and repeatedly washed. The yield was nearly quantitative. Melting point was found to be 135° C. (dec.).

Calc.: Sn, 53.78; N, 6.34; C, 16.31; S, 21.75; H, 1.81. Found: Sn, 50.23; N, 5.84; C, 15.76; S, 22.84; H, 2.20.

The products of this invention may find applications as biocides and stabilizers for plastics.

We claim:

1. A method for preparing an organotin compound of the general formula:

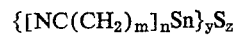

in which $m$ is an integer at least about 2, $n$ is an integer 1–3, $y$ is 1 or 2, $z$ is 1 or 3, and the combinations of $n$, $y$ and $z$ satisfy a tetravalent structure, which comprises reacting a sulfide selected from the group consisting of alkali metal sulfides and alkali hydrogen sulfides with an organotin halide

in which X is selected from the group consisting of chlorine, bromine, and iodine, and recovering said organotin compound.

2. A method for preparing an organotin sulfide compound of the general formula:

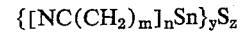

in which $m$ is an integer at least about 2, $n$ is an integer 1–3, $y$ is 1 or 2, $z$ is 1 or 3, and the combinations of $n$, $y$ and $z$ satisfy a tetravalent structure, which comprises reacting a stoichiometric excess amount of sulfide selected from the group consisting of an alkali metal sulfide and an alkali hydrogen sulfide with an organotin halide

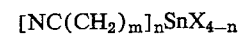

in which X is selected from the group consisting of chlorine, bromine, and iodine, acidifying the reaction mixture thereby forming said organotin sulfide.

3. A method according to claim 2 wherein said acidifying step is carried out by adding acetic acid to said reaction mixture.

4. A method according to claim 2 wherein said organotin halide has the general formula:

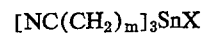

in which $m$ is an integer 2–4, and X is selected from the group consisting of chlorine, bromine, and iodine.

5. A method according to claim 2 wherein said organotin halide has the formula:

$$(NCCH_2CH_2)_3SnBr$$

and said sulfide is sodium sulfide.

6. A method according to claim 2 wherein said organotin halide has the general formula:

$$[NC(CH_2)_m]_2SnX_2$$

in which $m$ is an integer 2–4, and X is selected from the group consisting of chlorine, bromine, and iodine.

7. A method according to claim 6 wherein said organotin halide has the formula:

$$(NCCH_2CH_2)_2SnBr_2$$

and said sulfide is sodium sulfide.

8. A method according to claim 2 wherein said organotin halide has the formula:

$$[NC(CH_2)_m]SnX_3$$

in which $m$ is an integer 2–4, and X is selected from the group consisting of chlorine, bromine, and iodine.

9. A method according to claim 8 wherein said organotin halide has the formula:

$$(NCCH_2CH_2)SnBr_3$$

and said sulfide is sodium sulfide.

10. An organotin compound of the general formula:

$$\{[NC(CH_2)_m]_xSn\}_yS_z$$

in which $m$ is an integer at least about 2, $x$ is an integer 1–3, $y$ is 1 or 2, $z$ is 1 or 3, and the combinations of $x$, $y$ and $z$ satisfy a tetravalent structure.

11. An organotin compound according to claim 9 wherein said $m$ is less than 5.

12. An organotin compound of claim 10 wherein the compound has the formula:

$$[(NCCH_2CH_2)_3Sn]_2S$$

13. An organotin compound of claim 10 wherein the compound has the formula:

$$(NCCH_2CH_2)_2SnS$$

14. An organotin compound of claim 10 wherein the compound has the formula:

$$[(NCCH_2CH_2)Sn]_2S_3$$

References Cited

UNITED STATES PATENTS

| | | | |
|---|---|---|---|
| 2,832,753 | 4/1958 | Weinberg et al. | 260—45.75 |
| 3,015,644 | 1/1962 | Leistner et al. | 260—45.75 |
| 3,069,447 | 12/1962 | Mack | 260—429.7 |
| 3,082,230 | 3/1963 | Dorfelt et al. | 260—429.7 |
| 3,332,970 | 7/1967 | Smith | 260—429.7 |
| 3,347,833 | 10/1967 | Smith | 260—429.7 X |

OTHER REFERENCES

Dub: Organometallic Compounds, vol. II (1961), pp. 216, 220 and 227.

TOBIAS E. LEVOW, *Primary Examiner.*

W. F. W. BELLAMY, *Assistant Examiner.*